July 19, 1955      N. M. PAYNE      2,713,350
DAMPER
Filed Aug. 5, 1950
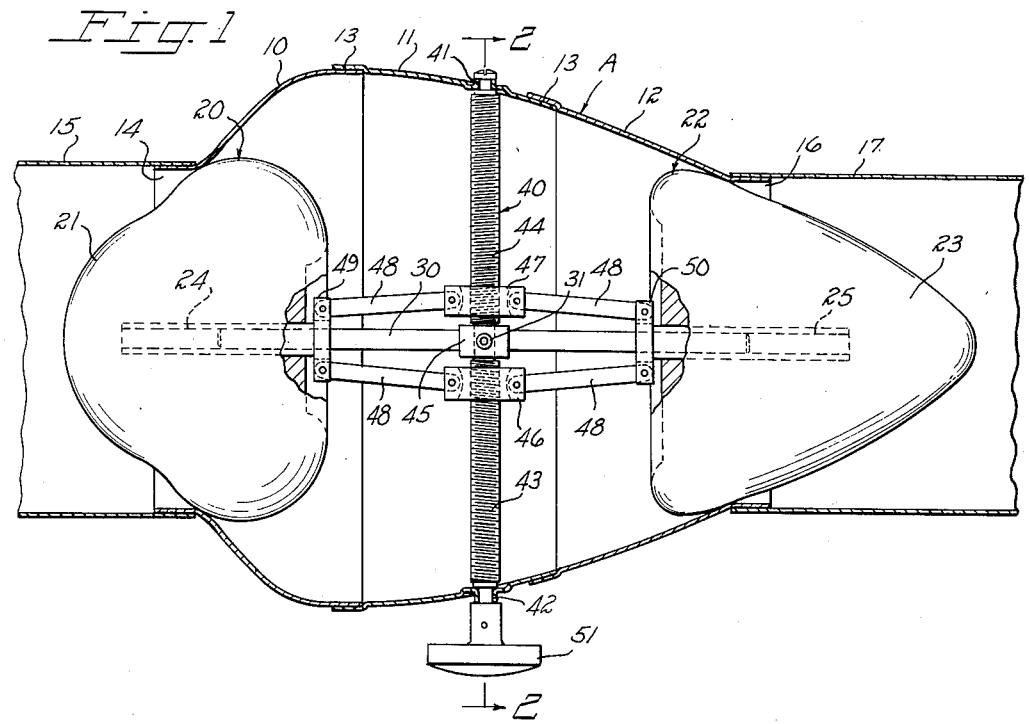
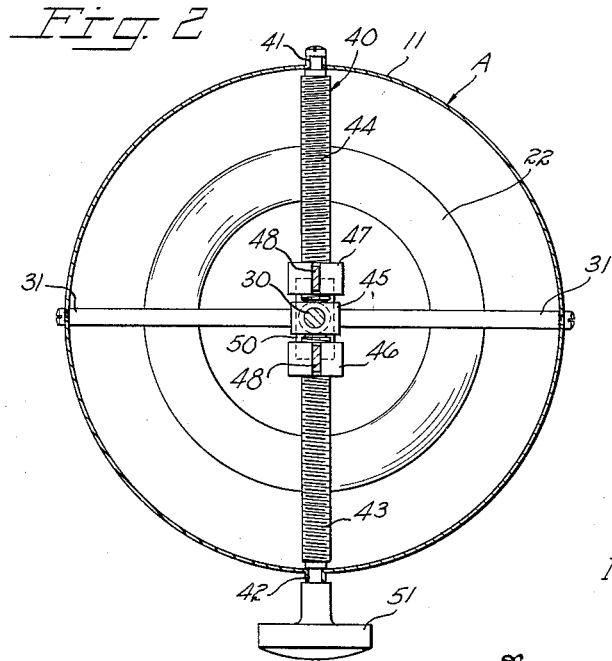
Inventor
NELSON M. PAYNE
By
Lindsey and Crutzman
ATTORNEYS

United States Patent Office 2,713,350
Patented July 19, 1955

2,713,350

DAMPER

Nelson M. Payne, Farmington, Conn., assignor to Tuttle & Bailey, Incorporated, New Britain, Conn., a corporation of Connecticut Application August 5, 1950, Serial No. 177,859

2 Claims. (Cl. 137—614.15)

The present invention relates to dampers for use in air conditioning and distributing systems, and, more particularly, to a damper having particular utility in systems operating under relatively high pressures.

It is an aim of the present invention to provide a damper of the type referred to which will be capable of obtaining a tight shut-off when installed in an air distributing system operating under relatively high pressures, such as five inches of water, and which will operate throughout its entire range from fully open to fully closed when the static pressure at the inlet of the damper is of the order referred to without undesirably increasing the noise level of the system.

It is a principal aim of the invention to construct a damper for air conditioning and distributing systems which will have improved characteristics from an acoustical standpoint so that when it is employed in high pressure systems it will not introduce undesirable noise into the system as a result of the air flow through the damper, particularly when the damper is positioned in its nearly closed position, it being a common characteristic of conventional dampers that they produce a very noticeable whistling or hissing noise under such conditions when operated in a system employing high pressure air.

A further aim of the invention is to provide a damper having the characteristics referred to and which will operate effectively in high pressure systems and yet which is, at the same time, of relatively small size and compact so that it may be incorporated in the system with convenience from an installation standpoint and without requiring excessive space allowances.

A further aim of the invention is to provide a damper of the type referred to which is of simple and economical construction so that it may be fabricated and assembled in an easy manner and at low cost and which can be mounted conveniently and efficiently in a wide variety of installations.

A further aim of the invention is to provide a damper which is readily adjustable so as to provide the desired amount of damping and which is foolproof in operation and rugged in construction so that it will operate effectively and efficiently over long periods of time.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figure 1 is a side view partially in cross section of a completely assembled damper constructed in accordance with the invention; and Fig. 2 is a cross sectional view taken along the line 2—2 of Fig. 1.

Referring to the drawings, the damper of the present invention is formed within a housing A of unique design and which, in the embodiment shown in the drawings, is constructed, for convenience, of three sections 10, 11 and 12. The sections 10, 11 and 12 are telescoped and secured together as at 13 to provide a continuous housing. The purpose of forming the housing from three sections is to simplify the fabrication of the device and to facilitate the assembly thereof.

The form of the housing A, which is an important feature of the device of the present invention, may be described for convenience as generally tear-drop shaped, it being noted in the cross sectional view of Fig. 1 that the section 10 is well rounded affording a generally partispherical shape to form the nose portion of the tear drop while sections 11 and 12 provide rearwardly and inwardly inclined arcuate surfaces forming the so-called tail of the tear drop.

The first section 10 is provided with an annular flange 14 having a diameter of approximately two-thirds of the maximum diameter of the housing and defining a circular opening to the interior of the housing and by means of which the housing may be connected to an inlet conduit 15, the latter being shown in fragmentary form. The inlet conduit 15 represents any suitable connection to the source of air to be distributed and, as mentioned above, it is contemplated that the inlet conduit 15 may be under a static pressure of the order of five inches of water.

The rear section 12 has a similar flanged portion 16 defining a circular exit opening from the tear drop housing and may be connected in the usual manner to a conduit 17 shown in fragmentary form, the conduit 17 being the entrance to a diffusing unit or the like into which the air is to be introduced as controlled by the damper of the present invention.

The actual size of the housing will be determined by the size of the inlet and outlet flanges required for the particular inlet and outlet conduits with which the damper is to be used, it being apparent that the dimensions of the device are all relative.

The portion of the front section 10 at the juncture with the flange 14 forms a circular seat which is rounded in cross section for cooperation with a front closure member 20. The front closure member 20 is also circular in cross section and is tapered so as to effectively seat in the inlet to the housing. The forward end of the closure member 20, generally denoted at 21, is rounded in side view so as to provide a smooth, uninterrupted and streamlined projection into the air flow from the inlet conduit 15. The closure member 20 is shown in the drawings in seated position, in which position the flow of air is fully shut off, but it will be realized that, when the closure member 20 is unseated from the nose of the housing by movement axially of the housing as described hereinafter, the flow of air permitted between the closure member 20 and the nose portion of the housing will be through an annular opening defined by side walls of a gentle curvature on each side thereof.

In a similar manner, the exit opening at the flange 16 is adapted to be closed by a closure member 22 which is likewise circular in cross section and is provided with a tail portion denoted generally at 23 which is generally conical in shape and thus effectively stream-lined. Inasmuch as the seat formed by the portion of the housing adjacent the flange 16 is circular, as is the closure member 22, a tight shut-off of the air flow through the damper may be accomplished thereby. In addition, when the closure member 22 is unseated from the housing as by movement axially thereof, the outlet flow of air will be through an annular opening defined by the peripheral surfaces of the closure member 22 and the rear portion of the housing section 12, these portions being inclined in similar degree so that a smooth uninterrupted surface is provided for enclosing the flow of air.

In accordance with the invention, the closure members 20 and 22 are mounted for simultaneous movement axially of the damper and in opposite directions. In the embodiment shown in the drawings, this is accomplished by means of a positioning and adjusting mechanism comprising a guide rod 30 extending axially of the housing and supported in such axial position by a supporting rod 31 extending transversely of the housing as best shown in Fig. 2 of the drawings. The ends of the guide rod 30 are received in axial bores 24 and 25 of the closure members 20 and 22, respectively. The closure members 20 and 22 are thus adapted to slide axially on the guide rod 30 from a full seated position to any desired unseated position.

In order to operate the closure members 20 and 22 simultaneously and in opposite directions, there is provided a double toggle mechanism which includes a rod 40 extending transversely of the housing section 11 and journaled at 41 and 42 therein, the rod 40 having threaded portions 43 and 44 which are threaded in opposite directions. The central portion of the rod 40 is journaled in the bearing 45 supported centrally of the supporting rod 31.

Turnably mounted on the threaded portions 43 and 44 are threaded collars 46 and 47, respectively, which are connected by connecting arms 48 to sleeves 49 and 50 which are slidable on the guide rod 30 but are fixed to the closure members 20 and 22 respectively. Provided on the threaded rod 40 exteriorally of the housing is a knob 51 whereby the threaded rod 40 may be manually turned.

As will be apparent, turning of the knob 51 will result in turning of the threaded rod 40 causing the collars 46 and 47 to be moved together or moved apart depending on the direction of turning of the knob 51. When the collars 46 and 47 are moved in opposite directions, they will retract the sleeves 49 and 50 and hence the closure members 20 and 22 on the guide rod 30, thus increasing the inlet and outlet passageways of the device. In similar fashion, when the threaded rod 40 is turned in a direction to bring the collars 46 and 47 together, the sleeves 49 and 50 and hence the closure members 20 and 22 will be moved in opposite directions on the guide rod 30 to any desired extent up to full shut-off or seated position, which entirely closes the inlet and outlet passageways of the device.

It has been found that a damper constructed in accordance with the invention will provide a tight shut-off of the air flow from inlet conduit 15 to outlet conduit 17 even when the inlet conduit 15 is maintained at a high static pressure of the order of five inches of water. It has also been found that the inlet and outlet passageways may be adjusted very closely by turning the knob 51 so as to permit any desired pressure drop across the damper. Even where the pressure drop is very great, as when the inlet and outlet passageways are almost fully closed, there will be no material introduction of noise into the system. This is believed to be a direct result of the form of the housing and the use of the dual closure members constructed as above described and simultaneously operated to vary the inlet and outlet passageways in substantially equal degree. As will be appreciated, when the closure members are unseated, the air will be permitted to travel in a natural flow between the closure members and the housing and along the interior surface of the housing without turbulence and without meeting any abrupt obstructions, thus creating no substantial degree of noise.

The device is of simple construction and may be easily fabricated and assembled at low cost and yet is sufficiently rugged and foolproof in operation to accomplish the desired aims of the invention over long periods of time.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A damper for use in air distributing systems comprising a housing having a generally bulbous nose portion provided with a circular axially disposed air inlet passageway and a generally frusto-conical tail portion provided with a similar circular and axially disposed air outlet passageway, an axially disposed non-rotatable fixed supporting shaft in the housing, a pair of closure members slidably mounted exclusively on said shaft within the housing for movement toward and away from seated positions in said inlet and outlet passageways, respectively, the closure member for the inlet passageway being provided with a generally bulbous nose and peripheral surfaces conforming to the contour of said housing adjacent said inlet passageway, the closure member for said outlet passageway being provided with a generally conical nose for disposition within said outlet passageway and having peripheral surfaces conforming to the contour of said housing adjacent said outlet passageway, said closure members in the open position of said damper being withdrawn from said seated positions and defining with said housing a substantially unobstructed non-turbulent air flow passage through the damper, a linkage for simultaneously reciprocating said closure members on said shaft, and manually adjustable means for actuating said linkage.

2. A damper for use in air distributing systems comprising a housing having a generally bulbous nose portion provided with a circular axially disposed air inlet passageway and a generally frusto-conical tail portion provided with a similar circular and axially disposed air outlet passageway, a rod extending through said housing provided with spaced, reversely threaded portions and an intermediate unthreaded portion, a bearing member encircling said intermediate portion, an axially extending guide rod extending through said bearing member, a pair of closure members mounted for sliding movement on opposite ends of said guide rod toward and away from seated positions in said inlet and outlet passageways, respectively, the closure member for the inlet passageway being provided with a generally bulbous nose and peripheral surfaces conforming to the contour of said housing adjacent said inlet passageway, the closure member for said outlet passageway being provided with a generally conical nose for disposition within said outlet passageway and having peripheral surfaces conforming to the contour of said housing adjacent said outlet passageway, a threaded collar on each of said reversely threaded portions, a sleeve connected to each closure member and encircling said guide rod, and a pair of arms pivotally connecting each of said sleeves and said collars, whereby turning of said threaded rod will adjustably position the closure members in corresponding positions relative to the respective openings.

References Cited in the file of this patent

UNITED STATES PATENTS

| 120,311 | Muller | Oct. 24, 1871 |
| 1,387,446 | Astier | Aug. 16, 1921 |
| 1,679,774 | Larner | Aug. 7, 1928 |
| 1,802,720 | Junkers | Apr. 28, 1931 |
| 2,085,893 | Boland | July 6, 1937 |

FOREIGN PATENTS

| 344,956 | France | 1904 |
| 577,981 | Germany | 1933 |